(12) United States Patent
Edwards et al.

(10) Patent No.: US 10,587,125 B2
(45) Date of Patent: Mar. 10, 2020

(54) BATTERY PACK DISCHARGE AND CHARGER SYSTEM

(71) Applicant: Black & Decker Inc., New Britain, CT (US)

(72) Inventors: Elyse Edwards, Aberdeen, MD (US); Matthew J. Velderman, Baltimore, MD (US); William A. Rigdon, Baltimore, MD (US); Andrew E. Seman, Jr., Pylesville, MD (US); Daniel J. White, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 83 days.

(21) Appl. No.: 15/794,808

(22) Filed: Oct. 26, 2017

(65) Prior Publication Data

US 2018/0115169 A1    Apr. 26, 2018

Related U.S. Application Data

(60) Provisional application No. 62/413,109, filed on Oct. 26, 2016.

(51) Int. Cl.
| | |
|---|---|
| *H02J 7/00* | (2006.01) |
| *H01M 2/10* | (2006.01) |
| *H01M 10/04* | (2006.01) |
| *H01M 10/44* | (2006.01) |
| *H02J 7/14* | (2006.01) |

(52) U.S. Cl.
CPC ......... *H02J 7/0013* (2013.01); *H01M 2/1077* (2013.01); *H01M 10/0445* (2013.01); *H01M 10/44* (2013.01); *H02J 7/0021* (2013.01); *H02J 7/1415* (2013.01); *H02J 7/1438* (2013.01); *H02J 7/1492* (2013.01); *H01M 2220/20* (2013.01); *H02J 7/0054* (2013.01)

(58) Field of Classification Search
CPC ..................................................... H02J 7/0013
USPC .......................................................... 320/110
See application file for complete search history.

(56) References Cited

U.S. PATENT DOCUMENTS

| | | | | |
|---|---|---|---|---|
| 2007/0120366 | A1* | 5/2007 | Grant ...................... | F02B 63/04 290/1 A |
| 2009/0284022 | A1* | 11/2009 | Usselman ............... | F02D 29/06 290/38 R |
| 2012/0274077 | A1* | 11/2012 | Usselman ............... | F02D 29/06 290/1 A |
| 2014/0042970 | A1* | 2/2014 | Grigoryants ............. | B25F 5/00 320/114 |

\* cited by examiner

*Primary Examiner* — Suresh Memula
(74) *Attorney, Agent, or Firm* — Michael Aronoff

(57) ABSTRACT

A system includes a charger having one or more receptacles for charging one or more removable battery packs, where the charger is capable of being electrically coupled to an electrical bus of a prime mover. The charger is capable of operating in multiple different charging modes. The charger is capable of discharging energy from the removable battery packs to the electrical bus to charge one or more components electrically coupled to the electrical bus and/or drawing energy from the electrical bus to charge one or more of the removable battery packs.

13 Claims, 5 Drawing Sheets

BATTERY PACK DISCHARGE AND CHARGER SYSTEM

RELATED APPLICATIONS

This application claims priority under 35 U.S.C. § 119(e) to U.S. Provisional Patent Application No. 62/413,109, filed Oct. 26, 2016, titled "Battery Pack Discharge and Charger System".

TECHNICAL FIELD

This description relates to a battery pack discharge and charger system.

BACKGROUND

Users of outdoor cordless tools discharge their battery packs faster than they can charge them. The availability of charging power sources (e.g., AC outlet, DC cigarette lighter outlet, etc.) is often unavailable or does not provide enough power and energy to keep up with demand.

SUMMARY

According to one general aspect, a system includes a charger having one or more receptacles for charging one or more removable battery packs, where the charger is capable of being electrically coupled to an electrical bus of a prime mover. The charger is capable of operating in multiple different modes of operation to charge the removable battery packs at different rates of charge responsive to an amount of energy drawn from the electrical bus.

Implementations may include one or more of the following features. For example, the multiple different modes of operation may include a first mode of operation that charges the removable battery packs at a first rate of charge and a second mode of operation that charges the removable battery packs at a second rate of charge that is faster than the first rate of charge. The charger may be capable of discharging energy from the removable battery packs to the electrical bus to provide charge to one or more components electrically connected to the electrical bus. The charger is capable of drawing charge from the electrical bus and supplying charge to the electrical bus.

In another general aspect, a method for charging and discharging one or more removable battery packs includes measuring, at a charger having one or more receptacles for charging one or more removable battery packs, a state of charge of an electrical bus of a prime mover, automatically selecting a charging mode for charging the removable battery packs responsive to the measured state of charge of the electrical bus and charging the removable battery packs using the selected charging mode.

Implementations may include one or more of the following features. For example, the selected charging mode includes a first mode of operation that charges the removable battery packs at a first rate of charge and a second mode of operation that charges the removable battery packs at a second rate of charge that is faster than the first rate of charge.

The details of one or more implementations are set forth in the accompanying drawings and the description below. Other features will be apparent from the description and drawings, and from the claims.

BRIEF DESCRIPTION OF THE DRAWINGS

Like reference numbers indicate like components.

DETAILED DESCRIPTION

Figure 1:
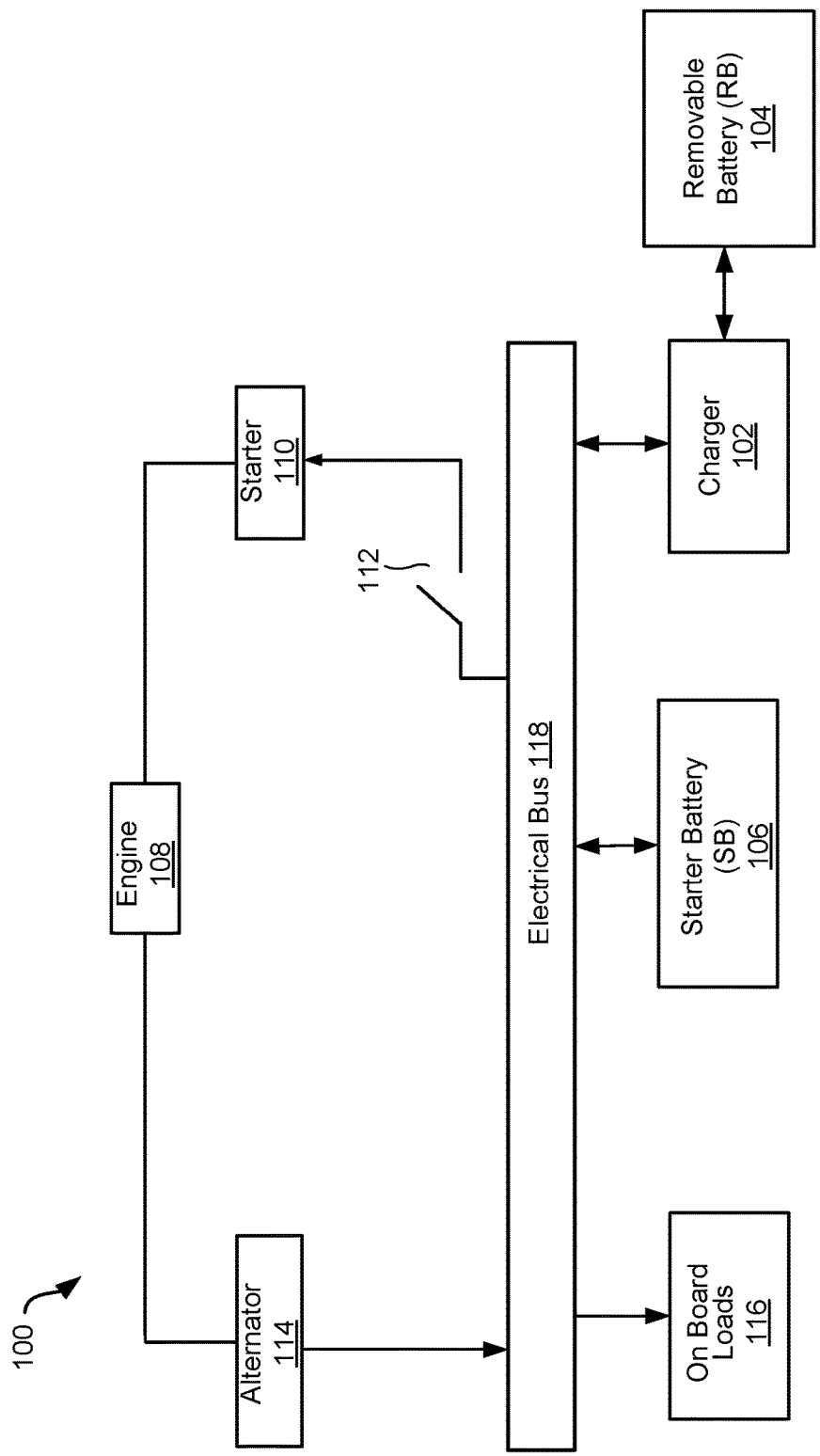
FIG. 1 is a block diagram of a battery pack charger system.

This document describes systems and techniques for charging a removable battery pack(s), a starter battery and for starting a prime mover. The battery pack discharge and charger system (also referred to as a battery pack charger system throughout) may be coupled to a prime mover to perform the functions of charging the removable battery pack, which may be coupled to the battery pack charger system, charging the starter battery of the prime mover and starting the prime mover itself. Throughout this document a removable battery pack may be referred to interchangeably as a removable battery and also annotated as RB in this document and the figures. A starter battery may be annotated as SB in this document and the figures.

As mentioned, the battery pack charger system may be connected to various types of different prime movers. Examples of prime movers include, but are not limited to, an internal combustion engine in an automobile, a lawnmower, a utility vehicle, a recreational vehicle, an all-terrain vehicle, stationary or portable engine driven pump/air compressor and other vehicles and equipment. In this manner, the battery pack charger system helps to overcome user frustrations with cordless tools including outdoor cordless tools, where users are frustrated due to the buying, run time and charging of a removable battery pack. Without this battery pack charger system, a user's choice for charging removable battery packs are more limited, including finding an AC outlet from which to charge batteries quickly or charging slowly from an available DC outlet. In an outdoor application context, the limited availability of AC outlets creates a high demand for improving the availability of DC chargers and their associated charge rates. Users desire more mobile chargers and chargers require an energy source. The battery pack charger system solves this problem by using the prime mover, such as an internal combustion engine, and its related components to charge removable battery packs and to perform other functions related to the components of the prime mover.

In addition to charging the removable battery packs, the battery pack charger system is also capable of charging the starter battery of the prime mover and energizing the engine starter (also simply referred to interchangeably as a starter) in order to start the prime mover. In one manner of operation, the battery pack charger system may operate in multiple, different modes. In a first mode, the battery pack charger system is capable of charging the removable battery pack with energy from the alternator of the prime mover. In a second mode of operation, the battery pack charger system is capable of charging the removable battery pack with energy from the alternator of the prime mover plus the starter battery from the prime mover. In the second mode of operation, the removable battery pack will be charged more quickly than the first mode of operation because multiple energy sources are being used to charge the removable battery in the second mode of operation. Throughout this document, the alternator may refer to any device that converts mechanical or chemical energy to electric energy for the purpose of charging/re-charging the starter battery and providing electrical energy for the on board loads of the vehicle/equipment.

In a third mode of operation, the battery pack charger system is capable of charging the starter battery of the prime mover using the removable battery pack. In a fourth mode of operation, the battery pack charger system is capable of jump starting the prime mover using the removable battery pack with or without the starter battery of the prime mover. The versatility of the battery pack charger system to operate in multiple, different modes provides the user many options and capabilities when compared to previous choices of using either an AC outlet to charge batteries or to use a DC outlet to charge batteries. Additionally, the battery pack charger system provides quicker and more efficient charging times to charge the removable battery packs when compared to charging the removable battery pack with a DC outlet.

For example, as noted above AC outlets are not readily available to many outdoor users and the DC charge times may be slow. For instance, an average 12 V DC outlet from a vehicle can only provide 120 W of power requiring approximately 2 hours to charge a 240 W hour lithium-ion battery. This charge time may be unacceptable for users of outdoor cordless tools with a typical run time of 30 to 45 minutes. In comparison, the example battery pack charger system described herein can provide up to 360 W of power from a prime mover, which corresponds to a 45 minute charge time for the same 240 W hour lithium-ion battery. It is understood that the power amounts and charge time amounts for the battery pack charger system are provided as a non-limiting example.

FIG. 1 is a block diagram of a battery pack charger system 100. The battery pack charger system 100 includes a charger 102 that is capable of receiving and charging at least one removable battery pack 104. The charger 102 may be referred to as a smart charger because the charger 102 is capable of operating in multiple different charging modes, as will be discussed in more detail below, in either an automated or manual mode. The charger 102 may be electrically coupled to an electrical bus 118. The system 100 also includes a starter battery 106, where the starter battery is the starter battery for a prime mover, such as an engine 108. The starter battery 106 is also electrically coupled to the electrical bus 118. The engine 108 may be an internal combustion engine that is capable of providing power to multiple different types of equipment and or vehicles. The system 100 also includes a starter 110 that is electrically and mechanically coupled to the engine 108 for starting the engine 108, as is well known in the art. The system also includes a switch 112 (the ignition switch of the prime mover). The switch 112 is electrically coupled to the electrical bus 118. The starter 110 is electrically coupled to the switch 112. Upon a user turning or closing the switch 112, the starter 110 is electrically coupled to the electrical bus 118 thereby receiving electrically energy from either the starter battery 106 and/or the removable battery pack 104, as will be described in more detail below, to start the engine 108. The system also includes an alternator 114, which is mechanically coupled to the engine 108 and electrically coupled to the electrical bus 118.

The starter battery 106 may be any type of battery including a lead acid battery, a lithium-ion battery, or other types of batteries or combinations of batteries. In operation, the starter battery 106 is capable of performing multiple functions based on the environment in which the starter battery is installed along with the engine 108. For example, the starter battery 106 provides power through the electrical bus 118 to one or more on board loads 116, where the on board loads may be specific to the type of vehicle or equipment in which the starter battery 106 and the engine 108 are installed. The starter battery 106 also provides power through the electrical bus 118 and the switch 112 to the starter 110 to provide power to initially start the engine 108. Once the engine 108 is running and operational, the switch 112 opens and the running engine 108 operates the alternator 114, which provides power through the electrical bus 118 to recharge the starter battery 106.

The removable battery pack 104 may be a single removable battery pack or it may be multiple removable battery packs. The removable battery pack 104 may be any type of battery chemistry including lithium ion and other types of battery chemistry.

As mentioned above, the charger 102 is capable of operating in different modes of operation. The charger 102 may include a user interface to enable a user to manually select one or more of the modes of operation. The charger 102 also may include one or more indicators, such as LED indicators, to provide status and other information to the user. Additionally and/or alternatively, the charger 102 may automatically switch between different modes of operation and/or adjust operational parameters (thresholds, coefficients used for calculations and/or algorithms) depending on different monitored conditions that are sensed by the charger 102. The charger 102 may include one or more microprocessors and/or one or more microcontrollers and/or application specific integrated circuits and/or discrete memory units to collect and process diagnostic information from the starter battery 106 (either through the electrical bus 118 or directly in other implementations) and/or the removable battery pack 104 and use the collected diagnostic information to modify the charging behavior of the charger 102 in an automated manner. The diagnostic information may include, but is not limited to, the state of charge, voltage potential, current flux, temperature of the ambient air, temperature of the battery(s) and internal resistance of the starter 110, starter battery 106 and/or removable battery pack 104.

The charger 102 may include a closed-loop control system that gathers this diagnostic information. The gathered diagnostic information may be used in all four modes of information. The diagnostic information may be used to approximate the amount of energy required by the starter 110 and the amount of energy available to energize the starter 110. The sources of energy from which to energize the starter include, but are not limited to, the starter battery 106 and the removable battery 104. The diagnostic information also may be used to determine the state of charge of the starter battery 106 and the removable battery pack 104 to determine whether and how to charge the removable battery pack 104. This diagnostic information also may include inferred capacity of the removable battery and/or starter battery, inferred capacity of the alternator and the status of the prime mover.

In a first mode of operation, the charger 102 may charge the removable battery pack 104 using energy from the alternator 114. In this manner, the alternator 114 provides power to the electrical bus 118 to maintain the starter battery at a constant state of charge, energize the on board loads 116 and provide energy to the charger 102 to charge the removable battery pack 104. For example, if the alternator 114 generates 180 watts (W) of power to the electrical bus 118, 80 W may be used to drive the on board loads 116 and 100 W may be used (through the charger 102) to charge the battery pack 104. As such, no energy is drawn from the starter battery 106 to drive the on board loads 116 or charge the removable battery pack 104, allowing the starter battery 106 to maintain its state of charge. During the operation, as the charger 102 draws energy from the electrical bus 118 to charge the removable battery pack 104, the voltage of the electrical bus 118 drops from a first voltage level (e.g., 14.2 V) due to the inherent impedances and current limitations of the alternator 114. To maintain a net charging effect for the starter battery 106 and adequate power for the on board loads 116, an electrical bus voltage of a second voltage level (e.g., 13.6 V) is needed. The charger 102 adjusts its draw on the electrical bus 118 to maintain the second voltage level (e.g., 13.6V) when charging the removable battery pack 104. In this manner, the charger 102 monitors the cumulative state of charge on the electrical bus 118, which includes the starter battery 106, the alternator 114 and the on board loads 116 as part of the collected diagnostic information, in order to properly determine a distribution of energy to the removable battery pack 104. The charger 102 is capable of monitoring the voltage level on the electrical bus 118 and drawing energy from the electrical bus 118 at a level that maintains at least the second voltage level on the electrical bus 118. The voltage thresholds and thus the amount of energy drawn from the electrical bus 118 by the charger 102 may vary based on factors such as time and temperature. Varying these thresholds and thus the energy drawn has the effect of allowing the charger 102 to establish a priority for charging the starter battery 106 versus the removable battery pack 104. During this first mode of operation, the engine 108 is running and operating the alternator 114 such that the alternator 114 may generate power to provide, through the electrical bus 118, to the starter battery 106 as well as to the charger 102 for charging the removable battery pack 104 as described above.

In a second mode of operation, the charger 102 may charge the removable battery pack 104 with energy from both the alternator 114 and the starter battery 106. In this manner, in the second mode of operation the charger 102 charges the removable battery pack 104 faster than the first mode of operation, which only used energy from the alternator 114. In the second mode of operation, the engine 108 is running and operating the alternator 114. The charger 102 draws energy from the electrical bus 118, where both the alternator 114 and the starter battery 106 are providing energy to the electrical bus 118. The charger 102 draws the energy provided by the alternator 114 and the starter battery 106 from the electrical bus 118 to charge the removable battery pack 104.

In the second mode of operation, for example, if the alternator 114 generates 180 W of power, that power is provided to the electrical bus 118. A portion of the energy from the alternator 114 may be provided to the on board loads 116, such as 80 W. The remaining portion of the energy generated by the alternator 114 may be provided to the charger 102 through the electrical bus 118 when the charger 102 draws the energy from the electrical bus 118, which in this case may be 100 W. Additionally, instead of maintaining the starter battery 106 at a constant state of charge, the starter battery 106 has a decreasing state of charge because it is also providing energy to the charger 102, again through the electrical bus 118, along with the energy from the alternator 114. For instance, the starter battery 106 may supply an additional 260 W of power for a combined total of 360 W of power to the charger 102 to charge the removable battery pack 104.

During this second mode of operation, like the other modes of operation, the charger 102 collects and analyzes system diagnostic information including information from the starter battery 106, the removable battery pack 104 and the other system components in order to properly charge the removable battery pack 104 in this mode. That is, the charger 102 may draw energy from the electrical bus 118 at a rate that maintains a minimum voltage on the electrical bus 118 needed to ensure operation of the on board loads 116 and sufficient reserve in the starter battery 106 to start the prime mover. Also, as with the other modes of operation, the charger 102 may perform this mode in an automated manner and/or in a manually operated manner as selected by a user. Of course, the manually selected mode of operation may be performed when the conditions necessary to operate in this particular mode are met such that the charging of the removable battery pack 104 may be properly accomplished using the power from both the alternator 114 and the starter battery 106.

In a third mode of operation, the charger 102 may use energy from the removable battery pack 104 in order to provide charge to the starter battery 106 through the electrical bus 118. This mode of operation may be performed when the engine 108 is not running and thus the alternator 114 is not running and is not providing energy to the starter battery 106. Thus, when the engine 108 is off, the charger 102 may direct energy from the removable battery pack 104 to charge the starter battery 106 through the electrical bus 118.

For example, in this third mode of operation, while the engine 108 is off the removable battery pack 104 may provide 600 W of power through the charger 102 to charge the starter battery 106, such that the starter battery has an increasing state of charge. This mode of operation may be useful when the starter battery 106 is below a minimum state of charge needed for providing power to the starter 110 to start the engine 108. The charger 102, as with the other modes of operation, collects and analyzes diagnostic information from the system components to determine when the removable battery pack 104 should be used to charge the starter battery 106 in an automated manner such as by determining a voltage on the electrical bus 118. When the voltage level of the electrical bus 118 falls below a certain level, then that may be an indication that the starter battery 106 state of charge is below a certain state of charge when the engine 108 is not running. In this state, the charger 102 may direct the flow of charge from the removable battery pack 104 to the electrical bus 118 such that the starter battery 106 draws energy from the electrical bus 118. Also, as with the other modes of operation, this third mode of operation may be manually initiated by a user.

In this third mode of operation, once the starter battery 106 has reached a minimum state of charge, the engine 108 may be started in a normal starting mode because the starter battery 106 now has enough state of charge to energize the starter 110 to start the engine 108. Once the engine 108 is started, the alternator 114 may begin its normal mode of operation to charge the starter battery 106 at which time the charging of the starter battery 106 using the removable battery pack 104 may be paused.

In a fourth mode of operation, the charger 102 may be used to jump start the starter 110 using energy from both the removable battery pack 104 alone or in combination with the starter battery 106. In this fourth mode of operation, the starter battery 106 may not have enough energy to energize and start the starter 110. It may be desirable to jump start the starter 110 instead of waiting for the removable battery 104 to charge the starter battery 106 to a minimum state of charge, as in the third mode of operation. It may be more desirable to start the engine 108 quickly without waiting for the starter battery 106 to reach that minimum state of charge. The charger 102 collects and gathers the diagnostic information from the electrical bus 118, which provides an indication that the state of charge of the starter battery 106 is below the minimum threshold needed to start the starter 110. In this manner, the fourth mode of operation may be used to provide energy from the removable battery pack 104 alone or both the removable battery pack 104 and the starter battery 106 to start the starter 110, which then starts the engine 108. After the engine 108 is started, the alternator 114 starts running and provides power to recharge the starter battery 106 to a sufficient state of charge and the removable battery pack 104 stops providing power to the starter battery 106 and/or to the starter 110.

Figure 2:
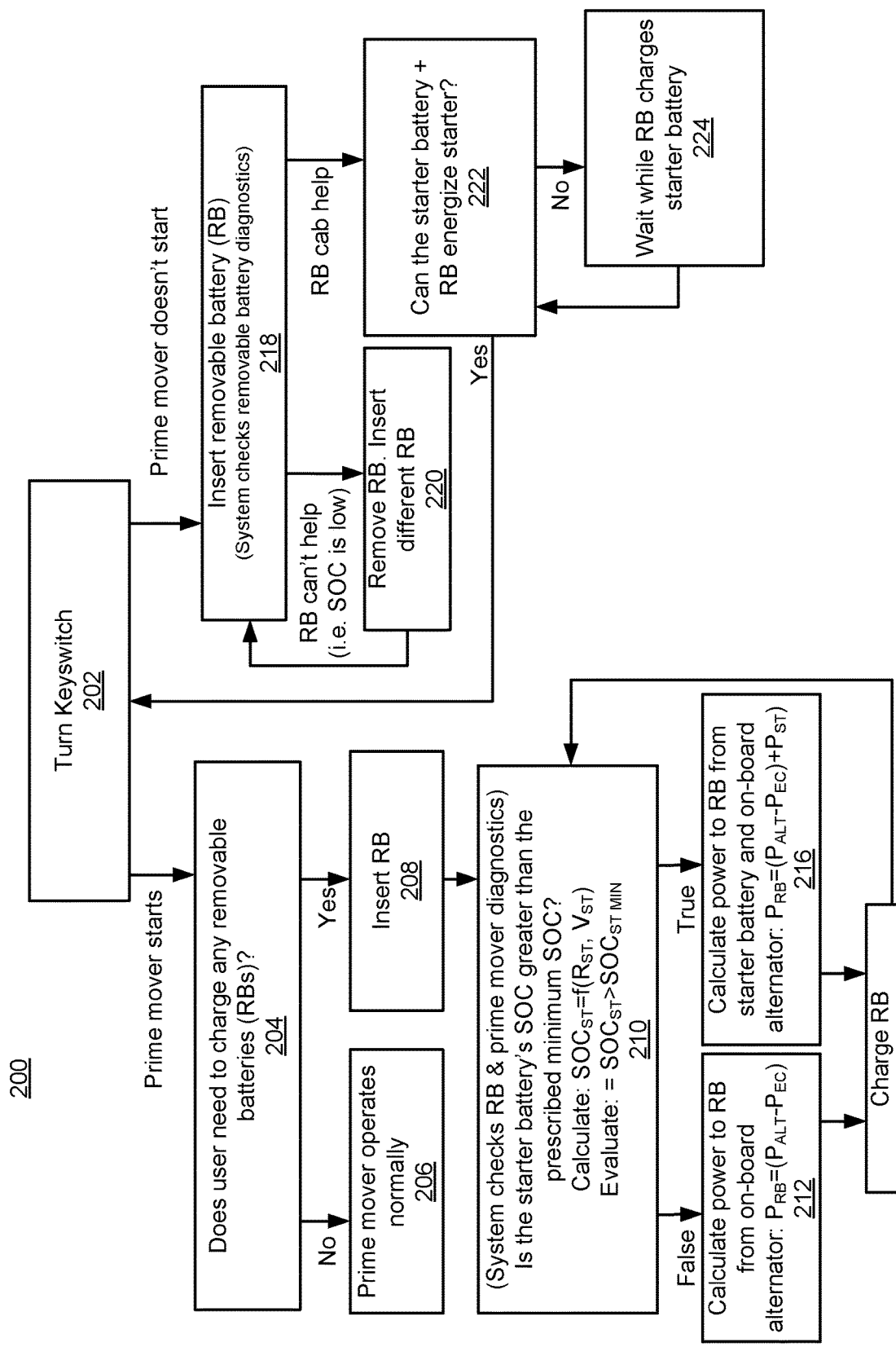
FIG. 2 is a flowchart illustrating example operations of the system of FIG. 1.

Referring to FIG. 2, an example process 200 illustrates example operations of the system of FIG. 1. As part of the process 200, a user may turn a key switch (step 202) to attempt to start the prime mover. For example, with reference to FIG. 1, a user may attempt to turn the switch such as switch 112 to start the engine 108. Depending on whether or not the engine 108 starts and is running will determine one or more of the modes of operation of the charger 102. If the prime mover starts, then the charger 102 may perform either the first or second mode of operation, as described above and as detailed more specifically in process 200. If the prime mover does not start, then the charger 102 may perform either the third or the fourth mode of operation, as described above and as detailed more specifically in process 200.

If the user does not need or want to charge one or more removable battery packs 104 (NO to step 204), then the prime mover operates normally (step 206). With reference to FIG. 1, when the switch 112 is closed, the starter 110 starts the engine 108 using energy from the starter battery 106 and the engine 108 runs normally to operate the alternator 114, which provides a charge to the starter battery 106. During normal operation, the starter battery 106 also provides power to the on board loads 116.

If the prime mover starts and the user needs or wants to charge one or more removable battery packs 104 (YES to step 204), then the user inserts one or more removable battery packs such as removable battery pack 104 into the charger 102 (step 208), if not already inserted. During a first mode of operation where the removable battery pack 104 is charged with energy from the alternator 114, the charger 102 checks the removable battery pack 104 and prime mover diagnostics. For example, the system checks if the starter battery state of charge is greater than the prescribed minimum state of charge (step 210). For example, the charger 102 may check the starter battery 106 state of charge indirectly through the electrical bus 118 by determining the current voltage present on the electrical bus 118 to determine whether the starter battery 106 state of charge is greater than a particular threshold, which is a prescribed minimum state of charge. The underlying equations that factor into the various voltage levels are taken into account without the charger necessarily performing these calculations. For example, the state of charge of the starter battery ($SOC_{ST}$) is a function of the internal resistance of the starter battery ($R_{ST}$) and the voltage across the starter battery ($V_{ST}$). The charger 102 evaluates whether the state of charge of the starter battery 106 is greater than the minimum threshold state of charge by looking at the voltage level of the electrical bus 118, as discussed above. Additional factors such as temperature and historical data also may be included to determine state of charge of the starter battery 106.

If the state of charge of the starter battery 106 is not greater than the minimum threshold based on the voltage level of the electrical bus 118, then process 200 calculates the power that can be drawn from the electrical bus 118 and provided to the removable battery pack 104 from the alternator 114 (step 212). For example, the charger 102 may indirectly calculate the power to the removable battery pack 104 from the alternator 114. Without performing a direct calculation, the charger 102 in theory uses the formula that the power of the removable battery pack 104, that is the net power to the positive from the negative removable battery is equal to the power from the alternator ($PA_{ALT}$) less the power to the on board electrical load ($P_{EC}$). Then, process 200 uses this power from the alternator 114 to charge the removable battery pack 104 (step 214). In this manner, the charger 102 operates in a first mode of operation to charge the removable battery pack 104 using the energy from the alternator 114 less the energy used to power the on board loads 116. In an implementation, the charger 102 draws energy from the electrical bus 118 to charge the removable battery pack 104 in an amount that maintains the electrical bus 118 at a particular voltage level. The particular voltage level of the electrical bus 118 enables charge to continue to be provided to the on board loads 116 through the electrical bus 118.

In the second mode of operation, when process 200 indirectly determines that the state of charge of the starter battery 106 is greater than the state of charge minimum threshold for the starter battery 106 (step 210), then power to the removable battery pack 104 is provided from both the starter battery 106 and the alternator 114 (step 216). Again, without performing specific calculations, the charger 102 may charge the removable battery pack 104 at a faster speed by drawing more energy from the electrical bus 118. In essence then, the power to the removable battery pack 104 is calculated as being equal to the power from the alternator ($PA_{ALT}$) minus the power to the on board loads ($P_{EC}$) plus the power from the starter battery ($P_{ST}$). For example, with reference to FIG. 1, the charger 102 determines the voltage level of the electrical bus 118 and draws a greater charge from the electrical bus 118 than in the first mode of operation, which has the effect of drawing energy from both the starter battery 106 and the alternator 114. Then, process 200 proceeds to charge the removable battery 104 (step 214). In this manner, process 200 illustrates that the first mode of operation charges the removable battery pack 104 using the power from the alternator 114 (step 212) and that the second mode of operation charges the removable battery pack 104 using the power from both the starter battery 106 and the alternator 114 (step 216) by the charger 102 controlling the amount of energy drawn from the electrical bus 118. Using both the starter battery 106 and the alternator 114 to charge the removable battery pack 104 is a quicker charging process then using only the alternator 114. Alternatively, based on the relationship of P (power)=E (voltage)×I (current), power, current and voltage as utilized in process 200 may be realized by calculation or measurement as inferred from the information collected by the charger 102 at the electrical bus 118.

While the removable battery pack 104 is being charged (step 214), process 200 may continuously check the starter battery state of charge to determine whether the starter battery state of charge is greater than the prescribed minimum state of charge (step 210) by measuring the voltage present on the electrical bus 118 to infer the starter battery state of charge. In this manner, process 200 continuously and iteratively evaluates the state of charge of the electrical bus 118 to determine the proper mode of operation to charge the removable battery pack 104. That is, if the state of charge of the starter battery 106 remains above the prescribed minimum state of charge, then the charger 102 remains in the second mode of operation to charge the removable battery pack 104 using both the starter battery 106 and the alternator 114 by drawing more energy from the electrical bus 118. If during the process 200 the state of charge of the starter battery 106 is less than the prescribed minimum state of charge based on the state of charge of the electrical bus 118, then the charger 102 may automatically switch to the first mode of operation, which in essence charges the removable battery pack 104 using only the power from the alternator 114.

Steps 210, 212, 214 and 216 of process 200 form a closed-loop control system, which may be performed by the charger 102. In this manner, the charger 102 monitors the removable battery pack 104, starter battery 106 and alternator 114 information and uses the monitored information via the electrical bus 118 to determine the appropriate mode of operation to charge the removable battery pack 104 in an automated manner, even if the monitored information regarding state of charge of the starter battery 106 is not directly measured by the charger 102. That is, the user is not required to switch the mode of operation from the first mode of operation to the second mode of operation or from the second mode of operation to the first mode of operation because the charger 102 is capable of automatically determining and switching to the correct mode of operation.

Returning back to the start of process 200, when the key switch is turned (step 202) and the prime mover does not start then the user may insert a removable battery pack 104 in the charger 102 if one is not already inserted (step 218). The system checks the removable battery pack diagnostics. For example, the charger 102 is capable of performing diagnostics on the removable battery pack 104 by calculating the state of charge of the removable battery 104. If the state of charge of the removable battery pack 104 is below a certain threshold, then the currently inserted removable battery pack 104 needs to be removed and a more fully charged removable battery pack 104 needs to be inserted (step 220). The system then checks the removable battery pack diagnostics for the newly inserted removable battery 104 (step 218).

If the removable battery pack 104 has a sufficient state of charge or a newly inserted removable battery pack 104 has a sufficient state of charge, then the system determines whether the starter battery 106 in combination with the removable battery pack 104 can energize the starter 110 in order to start the prime mover (step 222). For example, the charger 102 determines if the combination of the starter battery 106 and the removable battery pack 104 has enough power to energize the starter 110 to start the engine 108, which is the fourth mode of operation. If the starter battery 106 in combination with the removable battery pack 104 does not have enough power to energize the starter 110, then the removable battery pack 104 charges the starter battery 106 through the electrical bus 118 (step 224).

For example, when the charger 102 operates in the third mode of operation the removable battery pack 104 charges the starter battery 106 to a sufficient state of charge. It's possible that the user may need to insert or switch out a removable battery pack 104 in order to continue charging the starter battery 106 to a sufficient level of charge. The charger 102 may include an indicator, such as an LED light, to provide an indication to the user if a removable battery pack 104 needs to be changed out in order to provide sufficient charge to the starter battery 106. Once the starter battery 106 has reached a sufficient state of charge then the combination of the starter battery 106 and the removable battery pack 104 may provide enough power to energize the starter 110 and start the engine 108.

In the third and fourth modes of operation, the charger 102 performs the closed-loop control system functions by monitoring the removable battery pack 104 diagnostics and the electrical bus 118 diagnostics, which infers information about the starter battery 106, to determine the characteristics and thresholds of the removable battery pack 104 and the starter battery 106 to determine whether the system operates in the third mode of operation to simply charge the starter battery 106 or in the fourth mode of operation to provide power to the starter 110 using both the starter battery 106 and the removable battery pack 104.

The state of charge thresholds that are monitored and evaluated may vary depending on the particular prime mover system that the charger 102 is being connected to. For example, an average 25 HP engine starter requires 300-400 CCAs at approximately 12 V over a short period of time from the starter battery 106 in order to start the engine 108. If the starter battery 106 discharges too much or too quickly, the starter battery 106 will be unable to deliver this energy to energize the starter 110. The exact amount of energy required by the starter 110 and the amount of energy that the starter battery 106 is able to deliver at varying states of charge are unique in each system. The charger 102 continuously collects data from the removable battery pack 104 and the electrical bus 118 to identify these unique values and thresholds. The discrete data values are compared to the calculated thresholds to ensure that the batteries are able to deliver sufficient energy to the starter 110 at any given point in time. This function may be integral to maintaining normal operation of the prime mover. If it fails, then the user may not be able to restart the prime mover.

Figure 3:
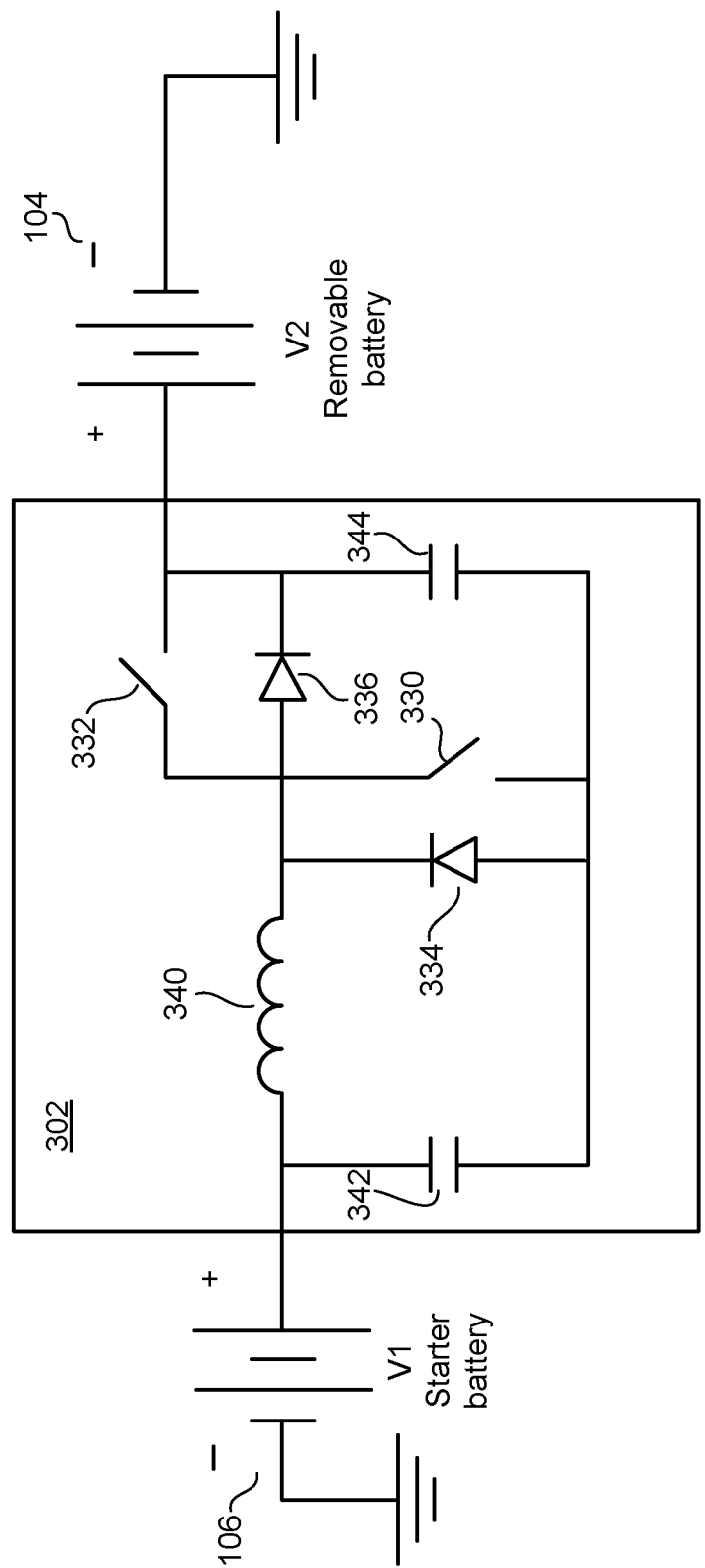
FIG. 3 is an example circuit for operating the charger of FIG. 1 in different modes of operation.

Referring to FIG. 3, a circuit 302 may be used to enable the charger 102 to operate in the different modes of operation. In one implementation, the circuit 302 may be implemented as part of the charger 102 of FIG. 1. The charger 102 includes a receptacle for holding the removable battery pack 104, which is represented by V2. The charger 102 may be connected to the starter battery 106, which is represented by V1, simply using two wire leads with one wire lead connected to each terminal of the starter battery 106. Examples of typical batteries used in the system may be a 12 V sealed lead acid battery for the starter battery 106 and a 40 V/6 A-hr lithium ion battery pack for the removable battery pack 104.

The circuit 302 allows the charger 102 to switch between buck and boost converter configurations depending upon the mode of operation. It is to be understood that circuit 302 is merely one example of a circuit to enable the charger 102 to operate in the different modes of operation and other circuits may be used to achieve the same performance and operation. The circuit 302 includes a switch 330, which may act as a boost converter switch, a switch 332, which may act as a buck converter switch, a diode 334 and a diode 336. The circuit 302 includes an inductor 340 and two capacitors 342 and 344. The components of the circuit 302 are arranged as illustrated in FIG. 3.

In the first and second modes of operation, the switch 332 is open and the switch 330 is pulse width modulated in order to provide energy from the starter battery 106 either alone or in combination with energy from the alternator 114, to charge the removable battery 104. In this manner of operation, the circuit 302 is performing as a boost converter. In the third and fourth mode of operations, the switch 330 is open and the switch 332 is pulse width modulated in order to provide energy from the removable battery 104 to the starter battery 106 either to charge the starter battery 106 in the third mode of operation or to energize the starter 110 using energy from both the removable battery 104 and the starter battery 106. In this manner of operation, the circuit 302 is performing as a buck converter. As described in the above embodiments, the general requirements are that the starter battery 106 is nominally at a lower voltage than the removable battery 104. By adding additional switches, capacitors, inductors and/or transformers, different power converter topologies may be realized to suit a particular arrangement of battery voltage requirements.

Figure 4:
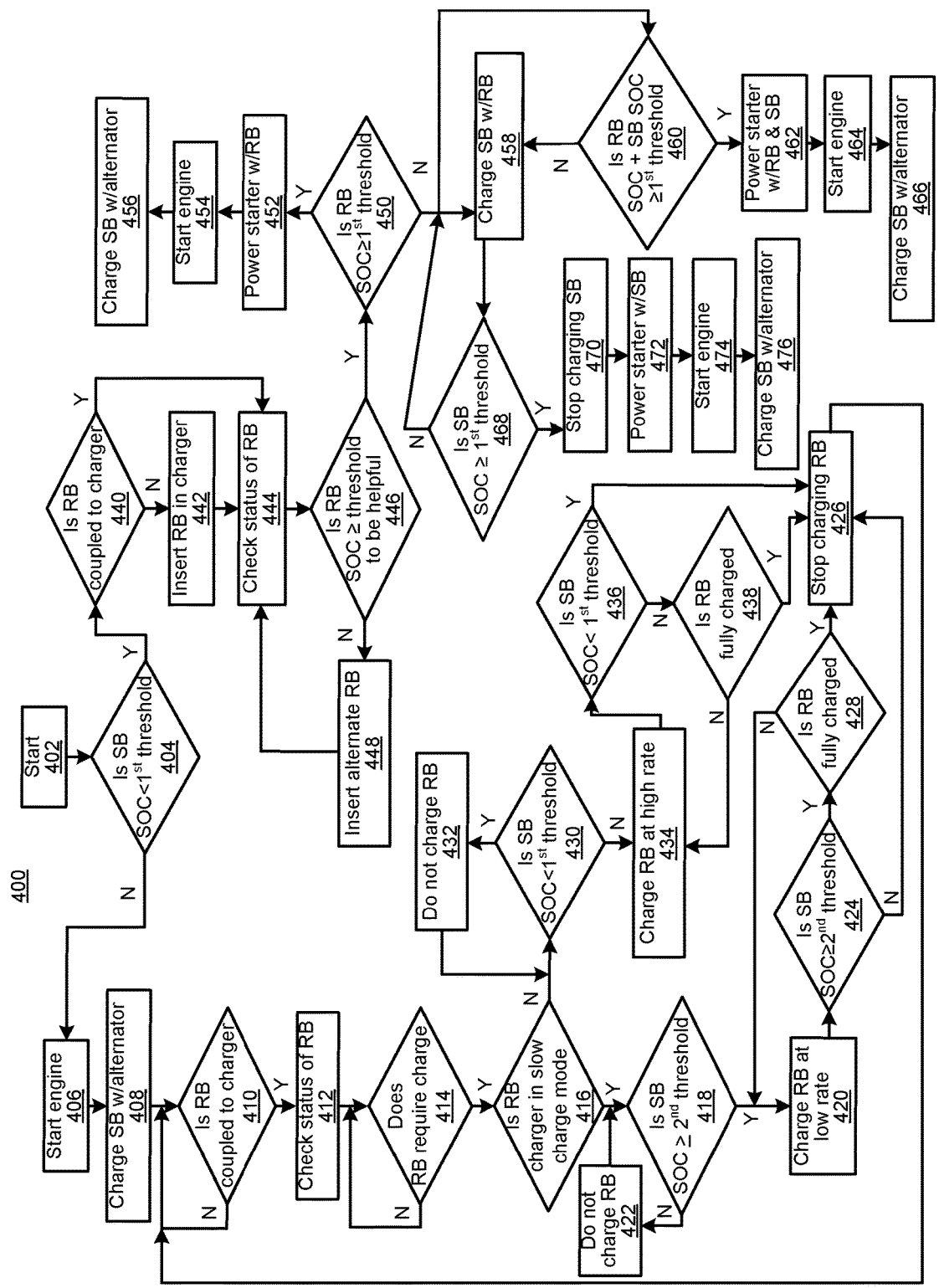
FIG. 4 is a flowchart illustrating example operations of the system of FIG. 1.

Referring to FIG. 4, process 400 illustrates example operations of the system 100 of FIG. 1. Process 400 starts at step 402 and first determines if the starter battery state of charge is less than a first threshold (step 404). If the starter battery state of charge is not less than a first threshold, that is, it is greater than or equal to a first threshold, then the starter battery 106 has enough power to start the engine 108 (step 406). Once the engine 108 is started then the alternator 114, which is running because the engine 108 has been started, will charge the starter battery 106 (step 408). If a removable battery 104 is not coupled to the charger 102 (NO to step 410), then the system will continue to charge the starter battery 106 using the alternator 114. If a removable battery pack 104 is coupled to the charger 102 (YES to step 410), then the charger 102 checks the status of the removable battery pack 104 (step 412). The charger 102 determines the state of charge of the removable battery pack 104 and based on the state of charge of the removable battery pack 104 determines if the removable battery pack 104 requires charging (step 414).

If the removable battery pack 104 does not require a charge (NO to step 414) than the charger 102 continues to monitor the status of the removable battery pack (step 412). If the removable battery pack 104 does require charging (YES to step 414), then the charger 102 may determine if the charger 102 is in a slow charge mode (step 416). If the charger 102 is in a slow charge mode (YES to step 416), which may be manually set by a user or automatically selected by the charger 102 based on collected diagnostic information, the charger 102 determines if the starter battery state of charge is greater than or equal to a second threshold (step 418). If the starter battery state of charge is greater than or equal to the second threshold (YES to step 418), then the charger 102 charges the removable battery pack 104 at a low rate (step 420), which is the same as the first mode of operation whereby the alternator 114 provides the energy to maintain the state of charge of the starter battery 106 and provides charging energy to the removable battery pack 104. If the starter battery state of charge is not greater than or equal to the second threshold (NO to step 418), then the charger 102 does not charge the removable battery pack 104 (step 422) until such time that the starter battery state of charge is greater than or equal to the second threshold. The first and second thresholds may be unique for each type of system in which the charger 102 is coupled.

Process 400 determines whether the state of charge of the starter battery 106 is greater than or equal to the second threshold (step 424). If the starter battery state of charge is not greater than the second threshold (NO to step 424), then process 400 stops the charger 102 from charging the removable battery pack 104 (step 426). If the starter battery state of charge is greater than the second threshold (YES to step 424), then process 400 determines if the removable battery pack 104 is fully charged (step 428). If the removable battery pack 104 is fully charged (YES to step 428), then process 400 stops the charger 102 from charging the removable battery pack 104 (step 426). If the removable battery pack 104 is not fully charged (NO to step 428), then process 400 has the charger 102 continue charging the removable battery pack 104 at a low rate (step 420).

Going back to step 416, if the charger 102 is not in a slow charge mode, then process 400 determines whether the starter battery state of charge is less than a first threshold (step 430). If the starter battery state of charge is less than a first threshold (YES to step 430), then the charger 102 does not charge the removable battery pack 104 (step 432) and continues monitoring the starter battery state of charge. If the starter battery state of charge is not less than the first threshold (NO to step 430), that is, it is greater than or equal to the first threshold, then the charger 102 charges the removable battery pack 104 at a high rate (step 434). While the charger 102 charges the removable battery pack 104 at a high rate, process 400 continues to monitor the starter battery state of charge and determines if the starter battery state of charge is less than the first threshold (step 436). If the starter battery state of charge is less than the first threshold (YES to step 436), the process 400 stops charging the removable battery pack 104 (step 426). If the starter battery state of charge is not less than the first threshold (NO to step 436), then process 400 determines if the removable battery pack 104 is fully charged (step 438). If the removable battery pack is fully charged (YES to step 438), then process 400 stops charging the removable battery pack 104 (step 426). If the removable battery pack is not fully charged (NO to step 438), then process 400 continues to charge the removable battery pack 104 at a high rate (step 434).

Going back to step 404, if the starter battery state of charge is less than the first threshold (YES to step 404), then process 400 determines if a removable battery pack 104 is coupled to the charger 102 (step 440). If a removable battery pack is not coupled to the charger 102 (NO to step 440), a user may insert a removable battery pack 104 into the charger 102 (step 442) and process 400 checks the status of the removable battery pack 104 (step 444). If a removable battery pack 104 is already in the charger 102 (YES to step 440), then process 400 checks the status of the removable battery pack 104 (step 444).

Process 400 determines if the removable battery pack state of charge is greater than or equal to a threshold to be helpful to the starter battery 106 (step 446). If the state of charge of the inserted removable battery pack 104 is less than the threshold (NO to step 446), then the user may insert an alternate removable battery pack 104 (step 448) into the charger 102, which is then checked for its state of charge (step 444). If the SOC of the inserted removable battery pack 104 is greater than or equal to a threshold to be helpful (YES to step 446), then process 400 determines if the removable battery pack state of charge is greater than or equal to a first threshold (step 450).

If the SOC of the removable battery pack is greater than or equal to the first threshold (YES to step 450), then the starter 110 is powered with the removable battery pack 104 (step 452), the engine 108 is started (step 454) and the starter battery 106 is charged by the alternator 114 (step 456). At this point, the process 400 may move to step 408 and process along the other decision path.

If the SOC of the removable battery pack is not greater than or equal to the first threshold (NO to step 450), then the charger charges starter battery 106 using the removable battery 104 (step 458) and process 400 determines if the removable battery pack state of charge plus the starter battery state of charge is greater than or equal to the first threshold (step 460). If the combined states of charge are not greater than or equal to the first threshold (NO to step 460), then the charger 102 continues to charge the starter battery 106 with the removable battery pack 104 (step 458). If the combined states of charge are greater than or equal to the first threshold (YES to step 460), then the starter 110 is powered by both the removable battery pack 104 and the starter battery 106 (step 462), the engine 108 is started (step 464) and the alternator 114 begins charging the starter battery 106 (step 466). At this point, the process 400 may move to step 408 and process along the other decision path.

While the removable battery pack 104 is charging the starter battery 106 (step 458), process 400 continuously determines if the starter battery state of charge is greater than or equal to the first threshold (step 468). If the starter battery SOC is not greater than or equal to the first threshold (NO to step 468), then the charger 102 continues to charge the starter battery 106 with the removable battery pack 104 (step 458). If the starter battery SOC is greater than or equal to the first threshold (YES to step 468), then the charger 102 stops charging the starter battery 106 with the removable battery pack 104 (step 470), the starter 110 is powered by the starter battery 106 (step 472), the engine 108 is started (step 474) and the alternator 114 begins charging the starter battery 106 (step 476). At this point, the process 400 may move to step 408 and process along the other decision path.

In other implementations, the charger 102 may be connected directly to one or more of the components instead of indirectly through the electrical bus 118. In this manner, the charger 102 may be able to collect diagnostics and state of charge information directly from one or more of the components such as the starter battery 106, the starter 110, the alternator 114 and the on board loads 116.

Figure 5:
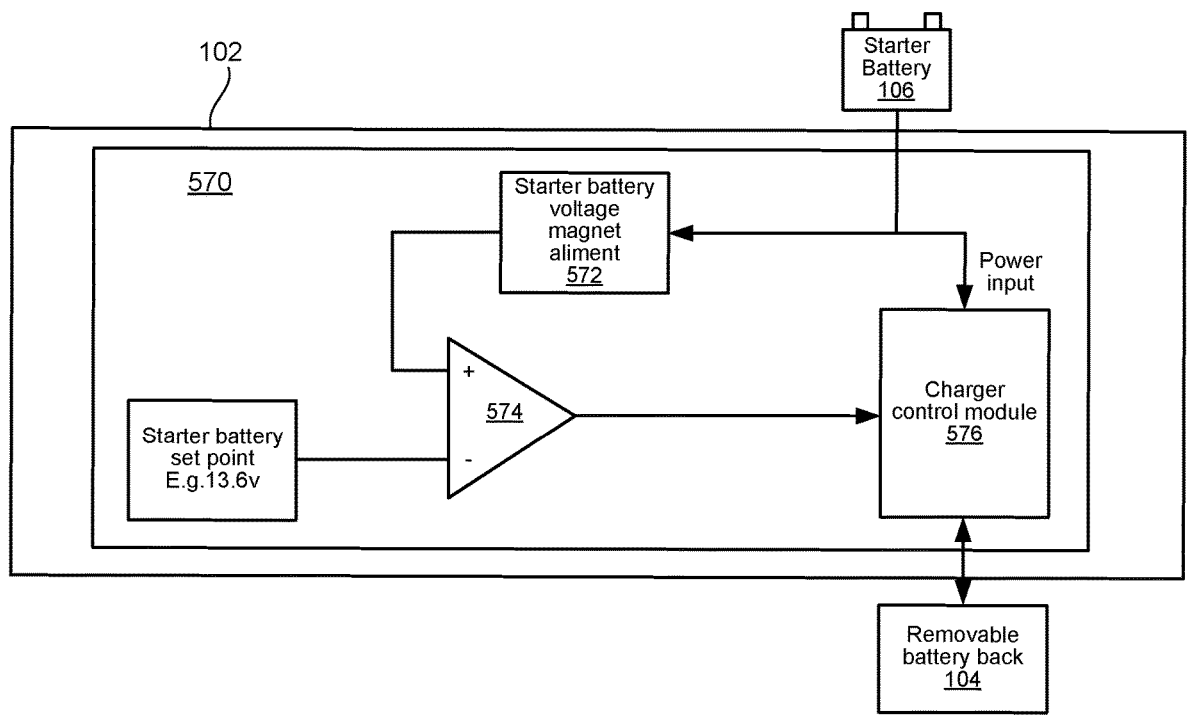
FIG. 5 is an example circuit for collecting diagnostic information from the starter battery and the removable battery.

Referring to FIG. 5, an example circuit 570 may be used to gather and evaluate the state of charge information directly from the starter battery 106 and the removable battery pack 104. The circuit 570 may be implemented as part of the charger 102. The circuit 570 includes a starter battery measurement element 572, an op amp 574, which provide control inputs to the charger control module 576. In this manner of operation, a reference signal (setpoint), in this example voltage, is utilized. The difference of the measured starter battery voltage and this reference signal (difference signal) is provided to the charger control module 576. Based on the value of the difference signal, a maximum output power level for charger control module 576 will be selected. The charger control module 576 will operate up to the maximum output power level for charging the removable battery 104. The charger control module 576 will monitor the characteristics of removable battery 104 to determine if the charger control module 576 output should be reduced below the maximum output level, as determined by the op amp 574.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the various techniques described herein may be implemented utilizing analog and/or mixed analog and digital circuitry. This would include op amps, resistors, transistors and/or reactive components to perform the control functions. These analog functions could be intermixed with any of the digital implementations embodied previously.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A battery charging system, comprising:
an electrical bus,
an engine, an alternator, driven by the engine, the alternator electrically coupled to the electrical bus to provide electrical energy to the electrical bus, a starter battery electrically coupled to the electrical bus, a battery charger electrically coupled to the electrical bus, a removable battery pack electrically coupled to the battery charger, the battery charger including circuitry to charge the removable battery using energy from the electrical bus.

2. The battery charging system, as recited in claim 1, wherein the battery charger monitors various parameters of the starter battery and selectively charges the removable battery pack at a various charging rates based on the monitored parameters.

3. The battery charging system, as recited in claim 1, wherein the battery charger circuitry to charge the removable battery pack uses energy only from the alternator.

4. The battery charging system, as recited in claim 1, wherein the battery charger circuitry to charge the removable battery uses energy from the alternator and the starter battery.

5. The battery charging system, as recited in claim 1, wherein the battery charger monitors a voltage level of the electrical bus.

6. A battery pack charger system, comprising:

an electrical bus;

a charger, capable of receiving and charging at least one removable battery pack, electrically coupled to the electrical bus;

a starter battery electrically coupled to the electrical bus;

a starter, capable of starting a prime mover;

the charger including circuitry to selectively provide energy to the removable battery pack or the starter battery or the starter.

7. The battery pack charger system, as recited in claim 6, wherein the charger provides energy to the starter from the removable battery pack and/or the starter battery.

8. The battery pack charger system, as recited in claim 6, further comprising an alternator, wherein the charger provides energy to the removable battery pack from the alternator and/or the starter battery.

9. The battery pack charger system, as recited in claim 6, further comprising a prime mover.

10. The battery pack charger system, as recited in claim 9, wherein the prime mover is an engine.

11. The battery pack charger system, as recited in claim 9, wherein the starter is electrically and mechanically coupled to the prime mover for starting the prime mover.

12. The battery pack charger system, as recited in claim 9, further comprising an alternator that is mechanically coupled to the prime mover and electrically coupled to the electrical bus.

13. The battery pack charger system, as recited in claim 6, further comprising a switch electrically coupled to the electrical bus and the starter, the switch electrically coupling the electrical bus and the starter when in a closed state to start the prime mover.

* * * * *